J. E. CHAMBERS.
METHOD OF PHOTOGRAPHING ON STONE.
APPLICATION FILED MAY 24, 1909.

968,645.

Patented Aug. 30, 1910.

attest.
H. G. Fletcher
E. F. Wallace

Inventor.
Joseph E. Chambers
By Higdon & Longan
attys.

UNITED STATES PATENT OFFICE.

JOSEPH E. CHAMBERS, OF ST. LOUIS, MISSOURI.

METHOD OF PHOTOGRAPHING ON STONE.

968,645.  Specification of Letters Patent. Patented Aug. 30, 1910.

Application filed May 24, 1909. Serial No. 498,086.

*To all whom it may concern:*

Be it known that I, JOSEPH E. CHAMBERS, a citizen of the United States, and resident of St. Louis, Missouri, have invented certain new and useful Improvements in Methods of Photographing on Stone, of which the following is a specification containing a full, clear, and exact description, reference being had to the accompanying drawings, forming a part hereof.

My invention relates to a method of photographing on stone, my object being to make it possible to produce a picture or likeness on memory or historical tablets, monuments, tombstones, or any place where it is desired to have a life-like presentment on stone.

In the accompanying drawings I have shown my process in producing a photograph on a tombstone, in which—

Figure 1:
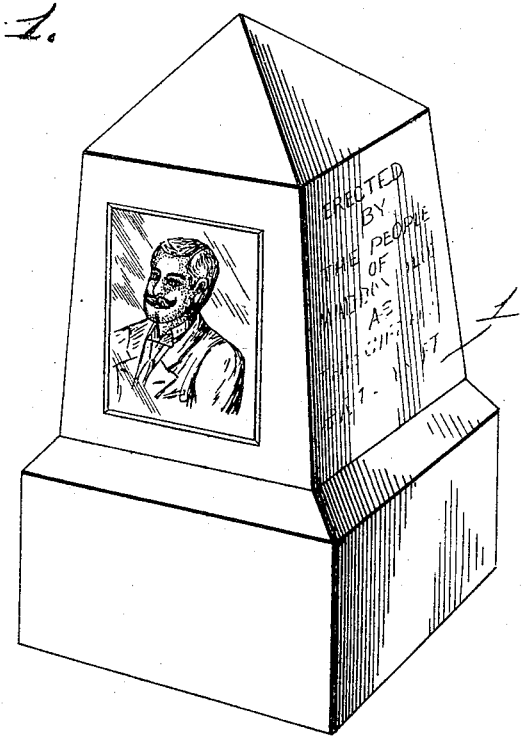
Figure 2:
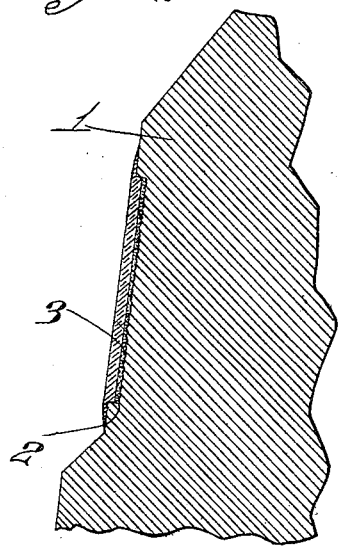

Figure 1 is a perspective view of a tombstone with the photograph applied thereto according to my process; and Fig. 2 is a sectional view.

While I have shown my invention in producing a photograph on a tombstone, it may be used, as above stated, in producing a photograph on memory tablets, historical tablets, etc. In place of applying the photograph directly to the tombstone, as illustrated, it is preferable for those unskilled in the process to produce the photograph on a tablet of stone, and then said tablet may be affixed to the monument or to the tombstone in any desired mechanical manner.

In carrying out my improved process, the stone on which the likeness or picture is to be produced or reproduced is (1) reduced to an even and flat surface, and (2) all organic, oleaginous or foreign matter that might mar the picture or cause a chemical change in the substances used, is removed by the application of an alkaline solution. Then the portion on which the photograph is to be produced or reproduced is etched with a solution of hydrofluoric acid, which not only etches the stone but has the tendency to remove the broken crystals that might fill the interstices of the stone during the process of polishing. The opening of these interstices or porous parts of the natural stone allows the sensitive photographic material which I subsequently apply to this etched surface to sink deeper into the substance of the stone and thereby produce a better and more accurate picture. I then wash the stone with pure water to remove the acid particles and loose fragments of stone, and then the surface is washed with alcohol to produce rapid evaporation.

Referring to the drawings, which represent one application of my process, 1 indicates the tombstone or monument and 2 indicates a recess formed in the same. This recess may be cut out in any manner.

The portion of the surface on which the photograph is to appear, as above stated, is polished to a smooth, even surface, and then I apply to said surface after being prepared, as above stated, a coating of sensitizing material 3. After the sensitizing material has been applied and has penetrated the porous openings of the stone, the picture or likeness is produced or reproduced on said sensitized surface, according to the well known processes of photography, and, after the photograph has been produced or reproduced on the sensitized coating, a coating of a solution of liquid sodium silicate, commonly known as liquid or soluble glass, is applied, which is allowed to harden and become a part thereof, thereby forming an exterior transparent coating and protection for the picture.

After the surface of the stone has been treated, as above described, the sensitized material is placed on said surface of a sufficient thickness to fill up the pits and porous openings of the stone and interstices made by the etching. The sensitized material is applied of such a thickness that the projecting crystalline formation of the stone will pass through the coating a small distance, and when the liquid silica is applied to the picture, the projecting particles of the stone will form a bond with the silica whereby the coating will be firmly affixed to the stone over the picture as a solid transparent mass impervious to moisture.

The usefulness of my process is apparent, as by it a picture or likeness may be produced or reproduced on monuments, tombstones, memory tablets, and the like, thereby presenting a lifelike appearance or picture of the subject of the memorial.

By my process any matter, such as memorial or historical written matter, data, etc., may be produced on stone, thus obviating the necessity of carving the matter on the stone, which is an expensive operation. It is well known that the descriptive matter on tombstones or monuments which are exposed to the elements soon becomes obliterated by the action of the elements and the disintegration caused by carving the stone. By my process, after the sensitized surface has been produced, as described, any matter may be produced thereon, and when coated with a solution of liquid silica it is thoroughly protected from disintegration by the action of the elements. The coating of liquid silica when applied and allowed to set and harden hermetically seals, as it were, the picture or descriptive matter beneath it, rendering the picture or the inscriptive matter immune to the action of moisture, etc.

I claim:

1. The herein described method of photographing on stone, which consists in polishing the surface of the stone to an even flat surface, applying to said surface an alkaline solution for removing the organic, oleaginous or foreign matter, etching said surface with a solution of hydrofluoric acid, applying to said surface a coating of sensitized material producing the photograph thereon, and applying over said photograph a coating of liquid sodium silicate.

2. The herein described method of photographing on stone, which consists in polishing the stone, treating said polished surface with an alkaline solution, etching said surface with a solution of hydrofluoric acid, applying to said surface a coating of sensitized material, producing the photograph on said sensitized material, and applying over said photograph a layer of liquid sodium silicate that is transparent and becomes a part of the composite mass.

3. The herein described method of photographing on stone, which consists in first polishing the stone, treating said polished surface with an alkaline solution, etching said surface so as to bring out the natural porosity of the stone, applying to said surface a coating of sensitized material to fill said pores, producing a photograph on said sensitized material, and applying over said photograph a solution of liquid sodium silicate.

4. The herein described method of photographing on stone, which consists in first polishing the stone, treating said polished surface with an alkaline solution, etching said surface so as to bring out the natural porosity of the stone, filling the pits of said surface with sensitized material to such an extent that the particles of stone surrounding the pits project beyond said sensitized material, producing the photograph on said sensitized material, and applying over said photograph a coating of liquid sodium silicate, which coating unites with the particles of stone projecting through the sensitized material.

In testimony whereof, I have signed my name to this specification, in presence of two subscribing witnesses.

JOSEPH E. CHAMBERS.

Witnesses:
 JULIUS E. GREFFET,
 CHARLES A. HAMICKIN.